US012751352B2

(12) United States Patent
Sivinski et al.

(10) Patent No.: US 12,751,352 B2
(45) Date of Patent: Oct. 6, 2026

(54) FERTILIZER AND ROW CLEANER MODULES FOR AGRICULTURAL ROW PLANTER

(71) Applicant: Harvest International, Inc., Storm Lake, IA (US)

(72) Inventors: Jeffrey Alan Sivinski, Cherokee, IA (US); Byron James Friesen, Storm Lake, IA (US)

(73) Assignee: Harvest International, Inc., Storm Lake, IA (US)

(*) Notice: Subject to any disclaimer, the term of this patent is extended or adjusted under 35 U.S.C. 154(b) by 598 days.

(21) Appl. No.: 18/314,914

(22) Filed: May 10, 2023

(65) Prior Publication Data

US 2024/0373778 A1 Nov. 14, 2024

(51) Int. Cl.

| | |
|---|---|
| ***A01C 7/06*** | (2006.01) |
| ***A01B 15/18*** | (2006.01) |
| ***A01B 27/00*** | (2006.01) |
| ***A01B 63/00*** | (2006.01) |
| ***A01C 21/00*** | (2006.01) |

(52) U.S. Cl.

CPC ................ *A01C 7/06* (2013.01); *A01B 15/18* (2013.01); *A01B 27/00* (2013.01); *A01B 63/008* (2013.01); *A01C 21/002* (2013.01)

(58) Field of Classification Search

CPC ............ A01C 7/06; A01C 7/006; A01C 7/203

See application file for complete search history.

(56) References Cited

U.S. PATENT DOCUMENTS

| | | | |
|---|---|---|---|
| D272,069 S | 1/1984 | Larsson | |
| D272,070 S | 1/1984 | Larsson | |
| D272,250 S | 1/1984 | Larsson | |
| 4,796,550 A | 1/1989 | Van Natta et al. | |
| 5,341,754 A | 8/1994 | Winterton | |

(Continued)

FOREIGN PATENT DOCUMENTS

| | | | |
|---|---|---|---|
| AU | 2009100124 | A4 | 3/2009 |
| CA | 2927668 | A1 | 12/2016 |

(Continued)

OTHER PUBLICATIONS

Dawn Floating Trash Wheels Row Cleaners, Nov. 8, 2021, Retrieved from the Internet: <URL:http://www.dawnequipment.com/Floating_Trashwheels.html/>, pp. 1-11.

(Continued)

*Primary Examiner* — Alicia Torres

(74) *Attorney, Agent, or Firm* — McKee, Voorhees & Sease, PLC

(57) ABSTRACT

The agricultural planter includes an open modular fertilizer assembly mounted upon a docking station, independently of the row unit. The fertilizer assembly on the row cleaner can be raised and lowered between the field and transport positions independently of raising and lowering the row unit. The cleaner floats so as to follow the contour of the ground. The fertilizer assembly applies fertilizer on both sides of the seedbed formed by the opening discs to a depth below the seed. The docking station isolates the row cleaner and fertilizer assembly from the planter unit for independent height control of the row cleaner and fertilizer assembly.

21 Claims, 15 Drawing Sheets

(56) References Cited

U.S. PATENT DOCUMENTS

| | | | | |
|---|---|---|---|---|
| 5,497,716 | A | 3/1996 | Shoup | |
| 6,070,673 | A | 6/2000 | Wendte | |
| D440,983 | S | 4/2001 | Miller et al. | |
| 6,253,692 | B1 | 7/2001 | Wendling et al. | |
| D455,762 | S | 4/2002 | Kaczmarski et al. | |
| 7,481,171 | B2 * | 1/2009 | Martin .................. | A01C 5/064<br>111/121 |
| D645,061 | S | 9/2011 | Plummer | |
| D709,529 | S | 7/2014 | Hutchinson et al. | |
| 9,232,687 | B2 | 1/2016 | Bassett | |
| D782,545 | S | 3/2017 | Forth | |
| 9,743,572 | B2 | 8/2017 | Martin | |
| D824,430 | S | 7/2018 | Sivinski et al. | |
| D840,282 | S | 2/2019 | Coste | |
| D850,887 | S | 6/2019 | Solow | |
| D868,845 | S | 12/2019 | Sonerud | |
| 10,555,452 | B2 | 2/2020 | Martin et al. | |
| 11,185,008 | B2 | 11/2021 | Sivinski | |
| 11,357,162 | B2 * | 6/2022 | Bergerfurth ........... | A01C 5/064 |
| 2011/0155031 | A1 | 6/2011 | Arnett et al. | |
| 2014/0262377 | A1 | 9/2014 | Winick et al. | |
| 2016/0150714 | A1 | 6/2016 | Unruh | |
| 2017/0258002 | A1 | 9/2017 | Sivinski | |
| 2019/0281756 | A1 | 9/2019 | Sivinski | |

FOREIGN PATENT DOCUMENTS

| | | | |
|---|---|---|---|
| DE | 1967917 | U | 9/1967 |
| DE | 19748837 | A1 | 5/1999 |
| EP | 3228170 | A1 | 10/2017 |
| WO | 2009149473 | A2 | 12/2009 |
| WO | 2010003142 | A2 | 1/2010 |

OTHER PUBLICATIONS

Martin-Till, “Accr Compact Floating Row Cleaner,” Brochure, 2021, 1 page.

Martin-Till, “Floating Row Cleaner/Fertilizer Opener Combos,” Retrieved on Jul. 18, 2023, 3 pages.

Sunco Frame Mounted Floating Saber Tooth Row Cleaners, Datasheet [online], Sunco, Retrieved from the Internet on Jul. 18, 2023: <URL:www.suncofarmequipment.com>, 1 page.

Yetter Farm Equipment, “2940-010 Air Adjust Coulter/Row Cleaner Combo,” Nov. 8, 2021, Retrieved from the Internet: <URL:https://www.yetterco.com/products/27-plantermount-row-cleaner-combos/298-2940010-air-adjust-coulterrow-cleaner-combo/>, pp. 1-4.

* cited by examiner

FERTILIZER AND ROW CLEANER MODULES FOR AGRICULTURAL ROW PLANTER

TECHNICAL FIELD

A common type of agricultural planters includes a toolbar with a plurality of row units mounted to the toolbar via bracket assemblies which allow the row units to be raised and lowered between transport and field positions. Fertilizer assemblies are often used on these agricultural planters, but do not position the fertilizer system in an optimum location relative to the seed furrow formed by the row unit. For example, some fertilizer systems are mounted on the frame of the planter, typically at a considerable distance ahead of the row unit. This position of the fertilizer system ahead of the toolbar causes interference when the toolbar wings are folded for transport. For example, the fertilizer coulters may hit opposing row units or wheels when the wings are folded together to the transport position. Also, the forwardly extended fertilizer system may not track properly with the seed furrow, such as during planting on contoured rows for erosion control. The improper fertilizer position relative to the seed furrow can create a "hot zone" of high salt fertilizer content, which young plant roots cannot absorb or tolerate, thereby causing damage to the crop roots. Some frame mounted fertilizer systems also do not permit installation of row cleaners, which leads to reduced yield due to excessive crop residue in the root zone.

Other fertilizer mounting systems mount the fertilizer assembly directly to the row unit, such as on the shank face plate or other frame or bracket structures. While such row unit fertilizer systems are located closer to the seed furrow, other adverse drawbacks exist. For example, the row unit linkage and the downforce components may have negative effects on the seed depth. Also, the parallel linkage arms must bear the draft loads of the fertilizer, which induces premature wear on the pivot bushings, bolts, and arms. Furthermore, these systems are fully bolted to the row unit face plate, and are not easily removed if the fertilizer is not required when the seed is planted. The unneeded fertilizer components are thus subjected to excessive wear, and waste tractor horsepower and fuel consumption as the fertilizer coulters are pulled through the field. The row unit mounted fertilizer systems can also cause vibration that negatively affects seed meter planting accuracy, and thus reduces yield.

Thus, there is a need for an improved and simpler fertilizer system for use with agricultural row units, which overcome the problems of the prior art.

Accordingly, a primary objective of the present invention is the provision of a modular fertilizer assembly which can be quickly and easily mounted to the toolbar via a docking station.

A further objective of the present invention is the provision of a fertilizer assembly having at least one coulter, a height-adjustable gauge wheel, and a fertilizer knife or tube for applying fertilizer to a slot cut in the soil by the coulter.

A further objective of the present invention is the provision of a modular fertilizer assembly positioned between a row cleaner and a row unit on the toolbar of an agricultural planter.

Another objective of the present invention is the provision of a fertilizer assembly which can be raised and lowered independently of the row unit.

Yet another objective of the present invention is the provision of a modular row cleaner which can be quickly and easily mounted to a toolbar of a planter via a docking station.

Still another objective of the present invention is the provision of a floating row cleaner module mounted on a docking station attached to a toolbar.

A further objective of the present invention is the provision of a modular fertilizer and a modular row cleaner which are both mounted to a common docking station on the toolbar of an agricultural planter.

These and other objectives become apparent from the following description of the invention.

SUMMARY

An improved agricultural planter according to the present invention includes a toolbar with a row unit mounted to the toolbar for movement between raised and lowered positions. The row unit includes a pair of furrow opening discs, a pair of gauge wheels to control the depth of the opening discs, and a pair of closing discs to close soil over the seed after the seed is planted in the furrow. The improvement comprises a fertilizer assembly module mounted to a docking station extending downwardly from the toolbar. The fertilizer module can be raised and lowered independently of the row unit. The fertilizer assembly includes at least one coulter and a gauge wheel controlling depth of the culture. The fertilizer module is hooked to the docking station and retained by a single bolt or pin, which allows for quick and easy mounting and dismounting of the fertilizer module. The improvement also includes a floating row cleaner module hooked to the docking station and retained with a single bolt or pin. The fertilizer assembly resides between the row cleaner and the row unit, thereby allowing proper and accurate tracking of the fertilizer knife relative to the furrow. The fertilizer module and the row cleaner module can be raised out of engagement with the ground, and can be removed from the planter when not needed.

DETAILED DESCRIPTION

Figure 1:
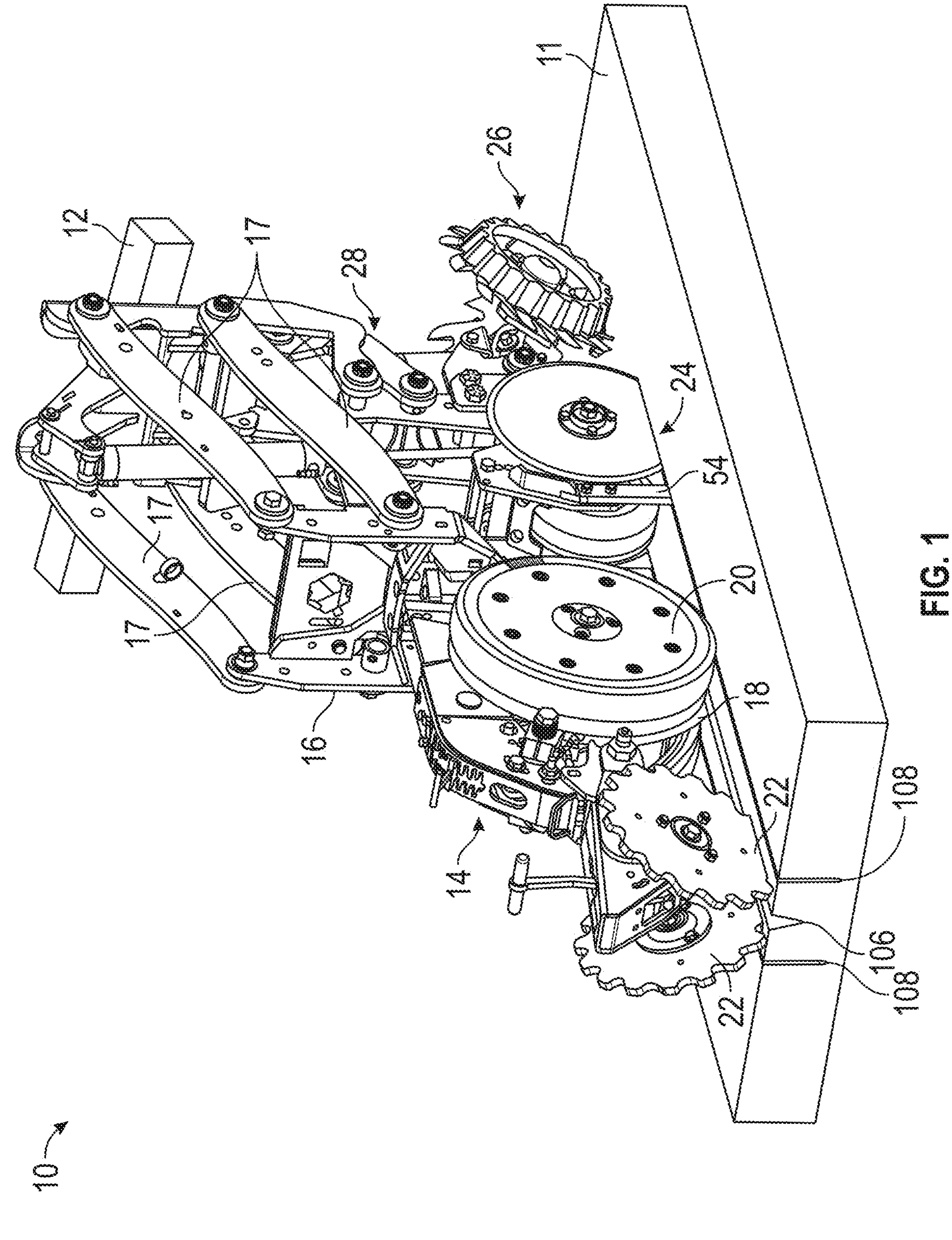
FIG. 1 is a rear perspective view of an agricultural row unit having the modular fertilizer assembly and modular row cleaner, according to the present invention.
Figure 2:
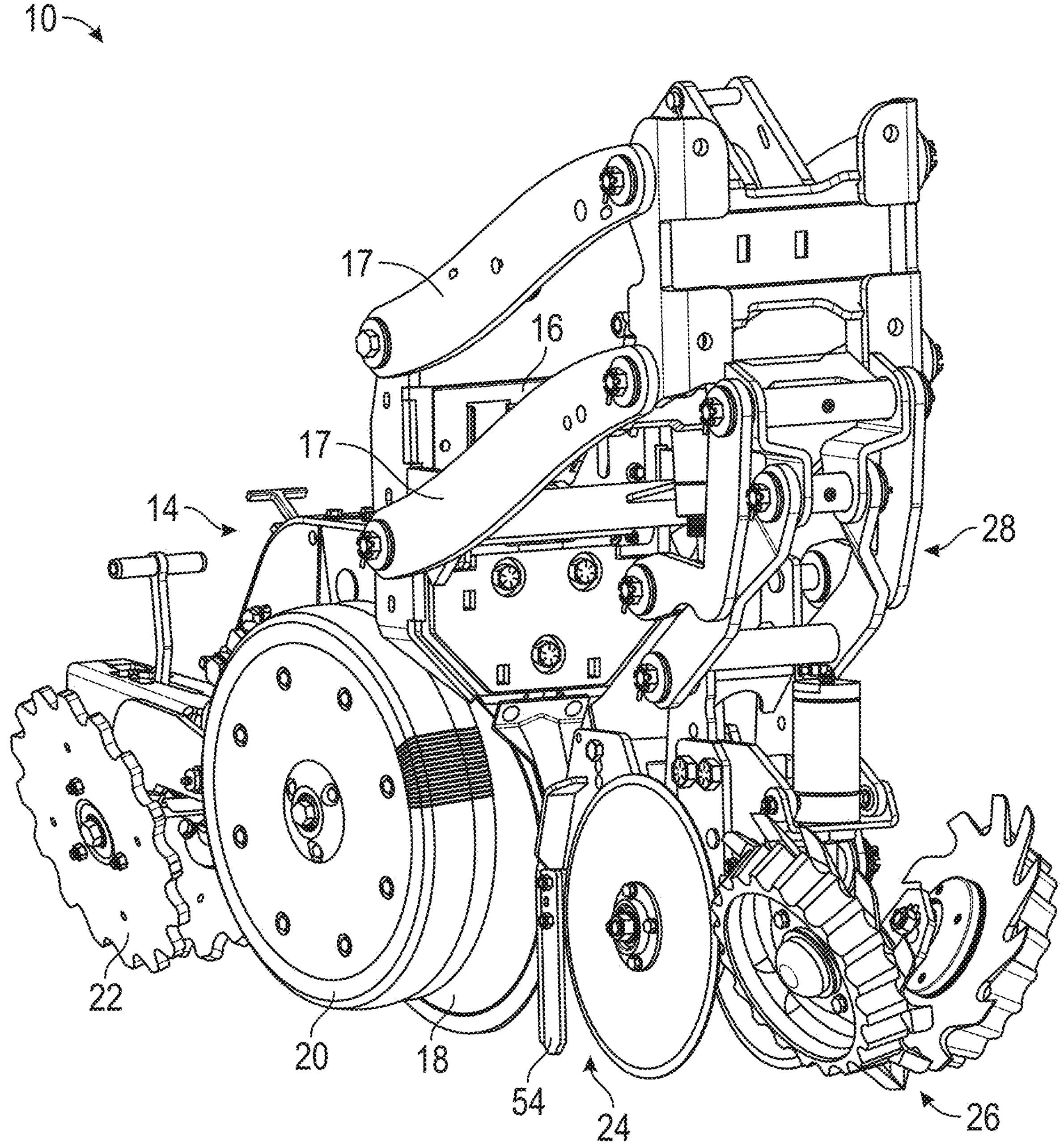
FIG. 2 is a front perspective view of an agricultural row unit having the modular fertilizer assembly and modular row cleaner in a lowered position, according to the present invention.

A planter assembly 10 is shown in FIGS. 1-4. The planter assembly 10 includes a toolbar 12 to which a row unit 14 is mounted via a bracket assembly 16. The bracket assembly 16 includes parallel link arms 17 which allow the row unit 14 to be raised and lowered via hydraulics or other actuation systems (not shown). The row unit 14 includes furrow opening discs 18, gauge wheels 20, and furrow closing discs 22. The row unit 14 and bracket assembly 16 are conventional.

The invention is directed toward a modular fertilizer assembly 24 (shown in FIGS. 5-8) and a modular floating row cleaner 26 (shown in FIGS. 9-12) which can be quickly and easily mounted to the toolbar 12 via a docking station 28 (shown in FIGS. 13-16). Both the fertilizer assembly 24 and the row cleaner 26 are hooked to the docking station 28 and each are retained by a single bolt or pin, as described in further detail below.

Figure 6:
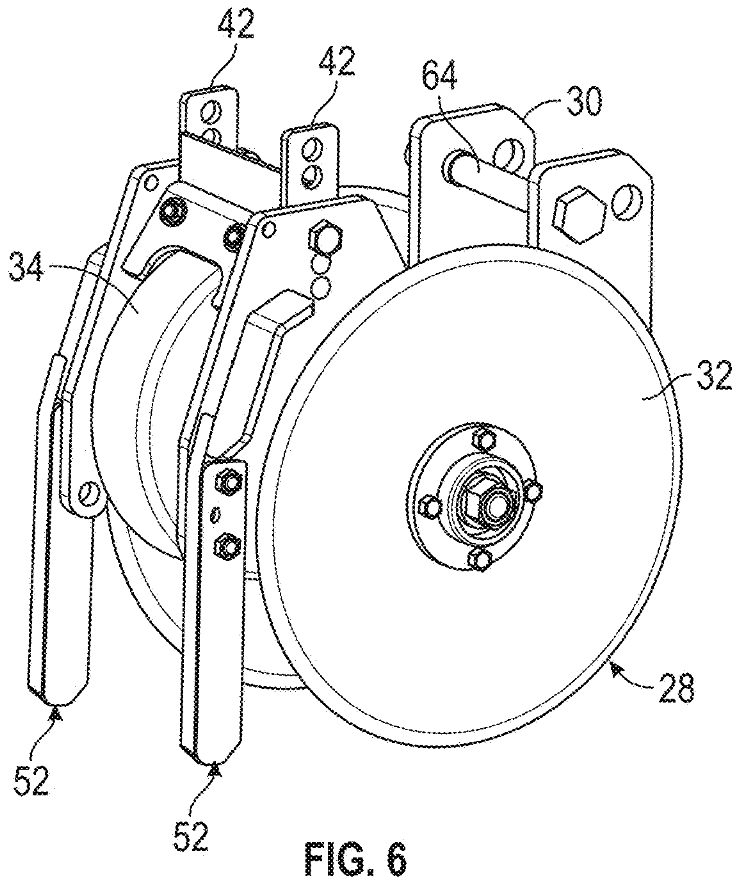
FIG. 6 is a rear perspective view of the fertilizer assembly module, with the gauge wheel raised.
Figure 7:
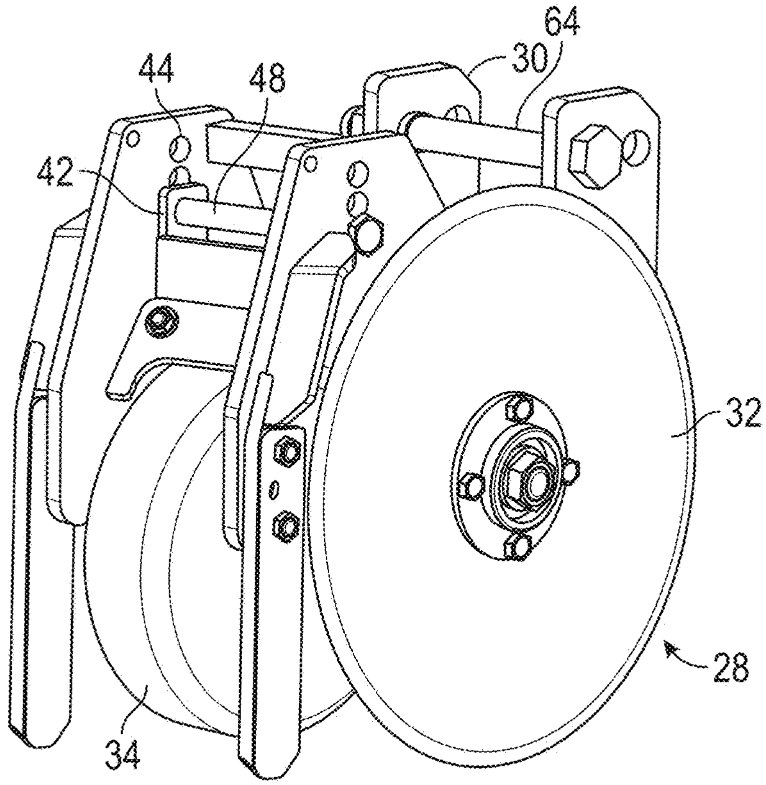
FIG. 7 is a rear perspective view of the fertilizer assembly module, with the gauge wheel lowered.

The fertilizer assembly 24 includes a frame 30, one or two discs 32, and a gauge wheel 34. The gauge wheel 34 is rotatably mounted on a subframe 36. The subframe 36 has opposite, outwardly extending posts 38 which extend through holes 40 in the frame 30. The coulters 32 are rotatably mounted on the posts 38, which may be threaded to receive a nut 50 to retain the coulters 32 on the posts 38. The gauge wheel 34 is mounted to the frame 38 by a pair of arms 42 having a series of holes 45 which align with holes 46 in the frame to receive a bolt or pin 48. The bolt 48 can be selectively positioned through different ones of the holes 45, 46 so as to raise and lower the height of the gauge wheel 34 relative to the coulters 32, and thereby control the depth of the coulters 32 in the soil 11. For example, FIG. 6 shows the gauge wheel 34 in a raised position wherein the coulters 32 will cut a shallow slit in the soil 11, and FIG. 7 shows the gauge wheel 34 in a lower position wherein the coulters 32 will cut a deeper slit in the soil 11.

Figure 8:
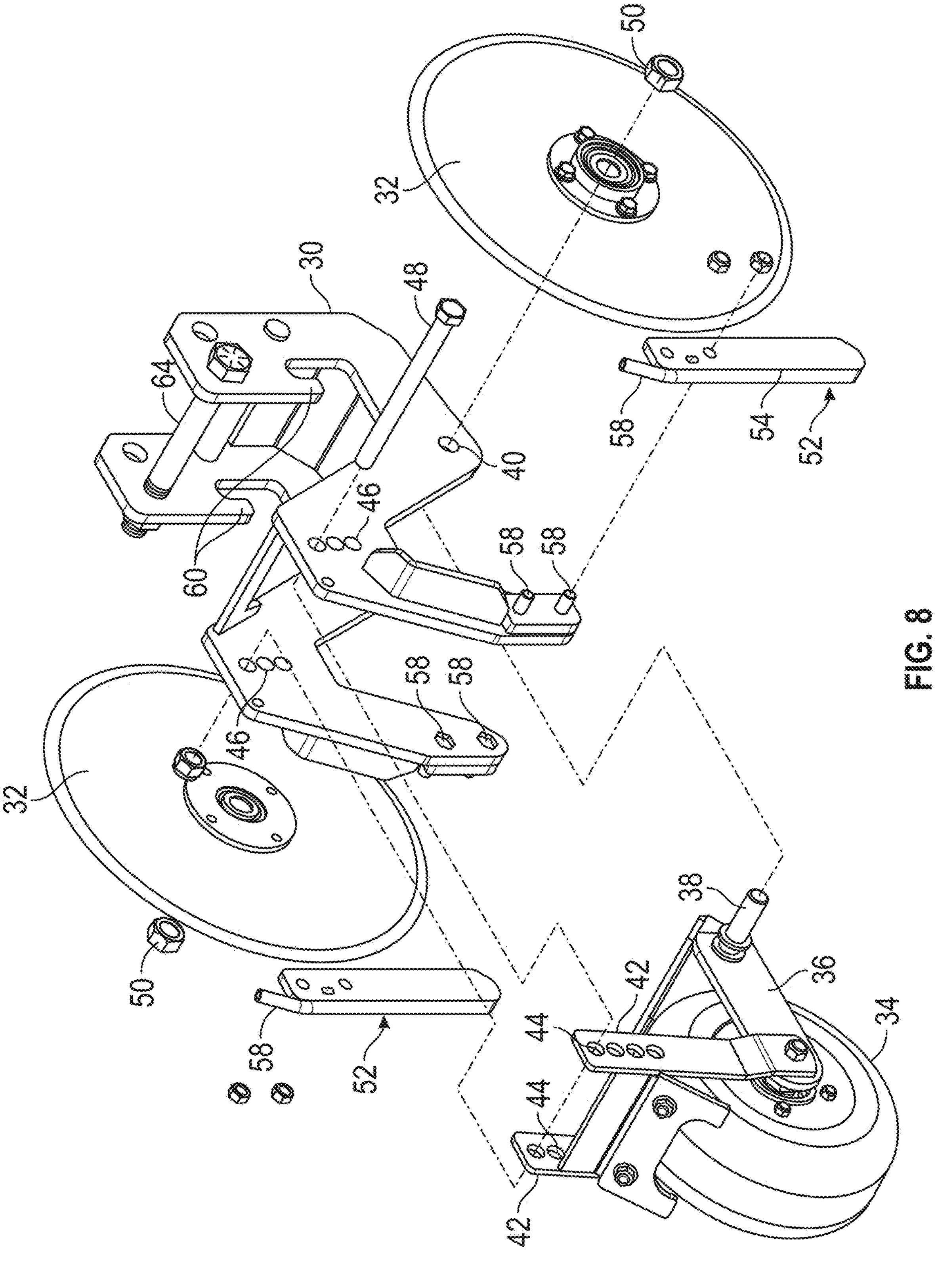
FIG. 8 is an exploded view of the fertilizer assembly.
Figure 9:
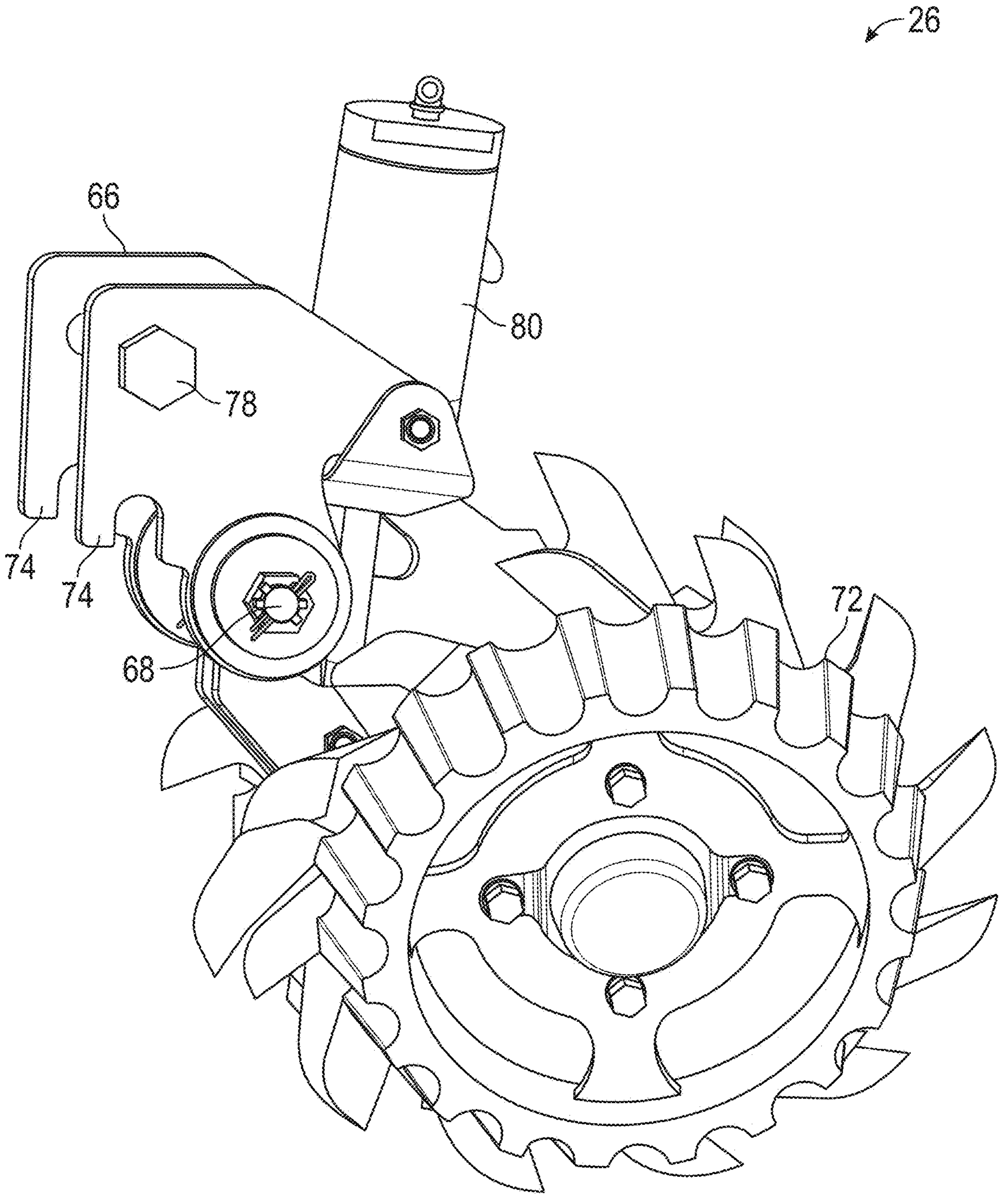
FIG. 9 is a perspective view of the row cleaner module according to the present invention, with the cleaner discs lowered.
Figure 10:
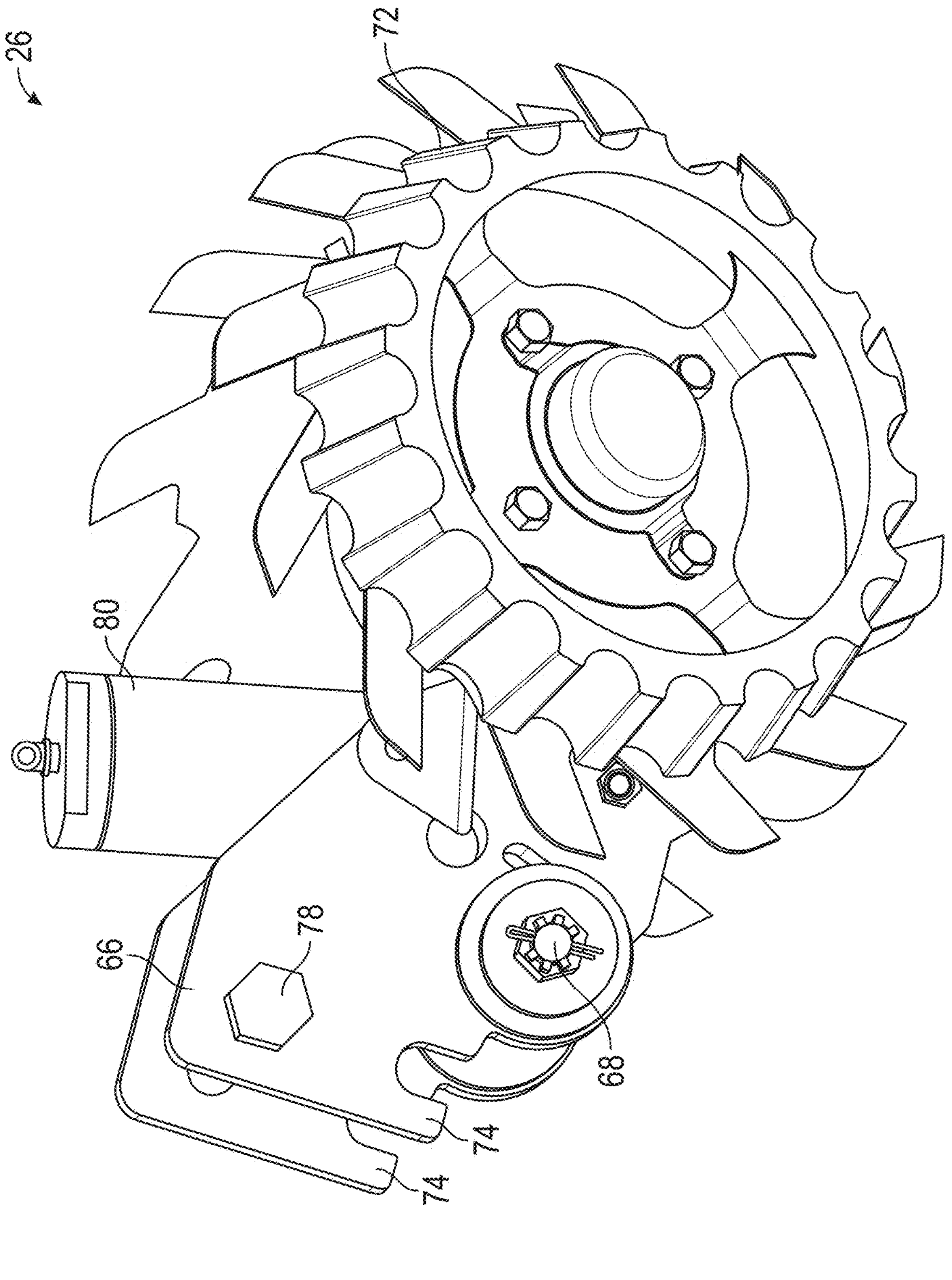
FIG. 10 is a perspective view of the row cleaner module according to the present invention, with the cleaner discs raised.
Figure 11:
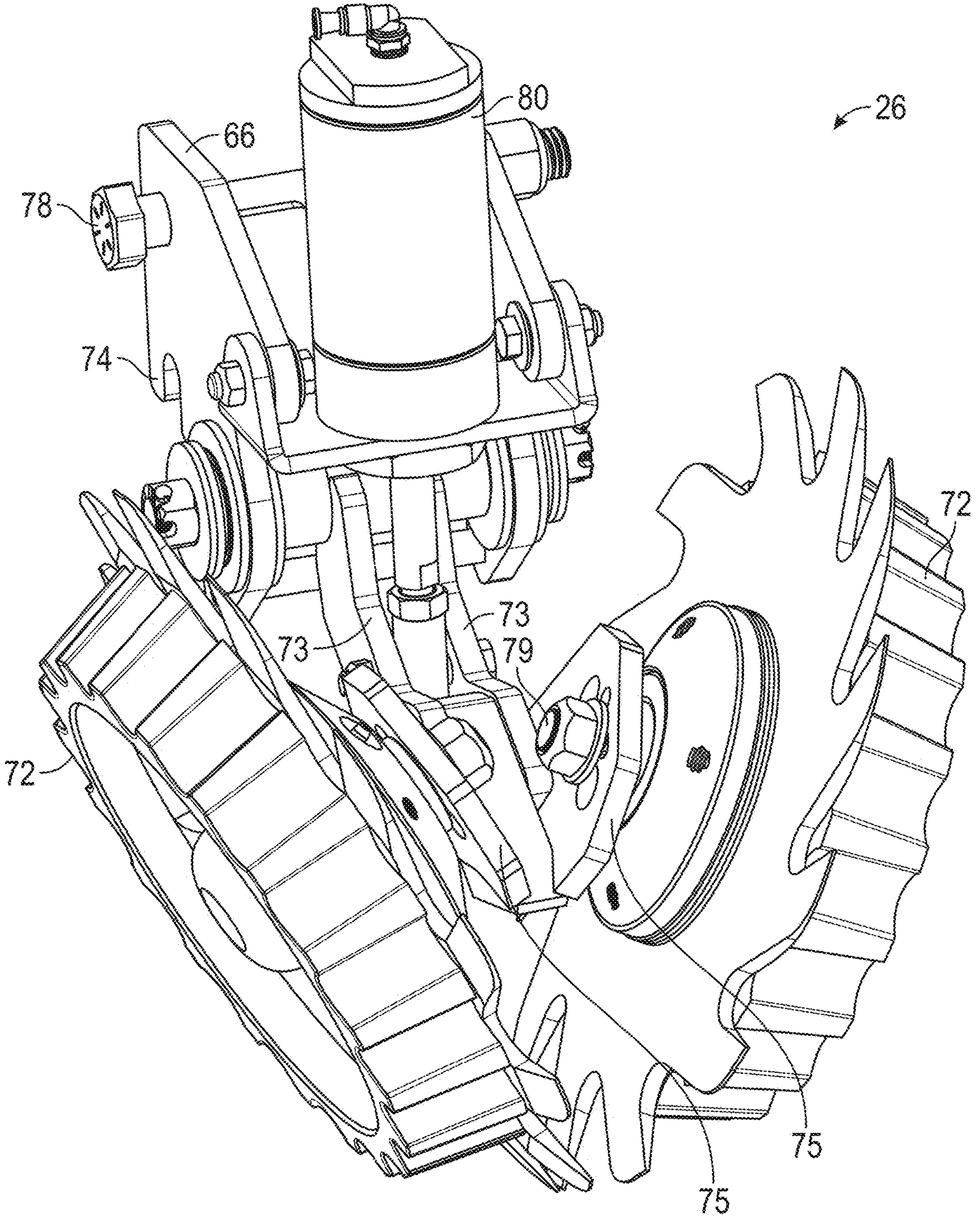
FIG. 11 is a front perspective view of the row cleaner assembly.
Figure 12:
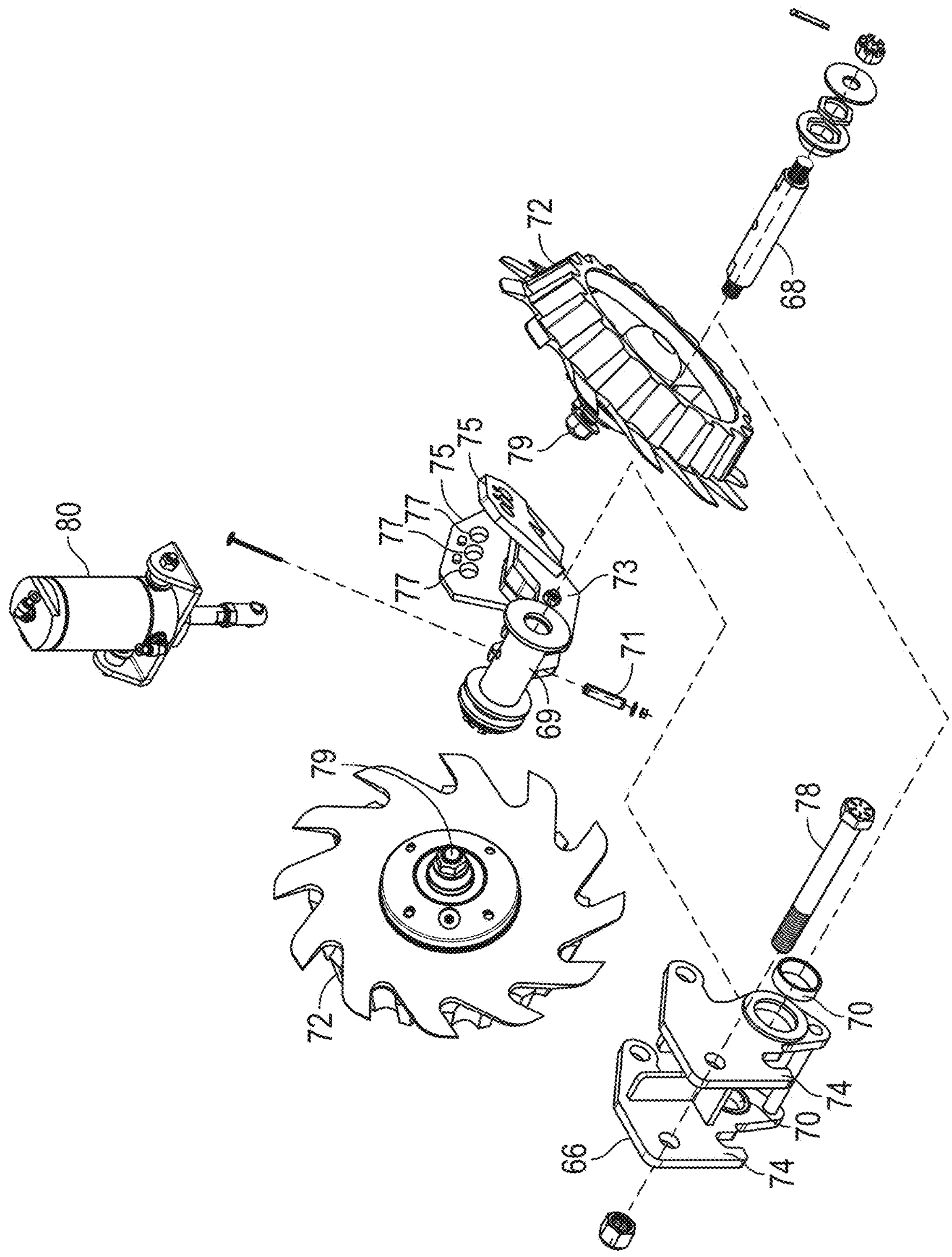
FIG. 12 is an exploded view of the row cleaner assembly.

A pair of fertilizer applicators 52 are mounted to each side of the frame 30 in any convenient manner. For example, as seen in FIG. 8, knives 54 are secured by bolts 56 to the frame 30. Applicator tubes 58 extend outwardly along the knives 54. The tubes 58 are operatively connected to a fertilizer supply tank or bin (not shown) to deposit fertilizer into the soil. The fertilizer may be solid (i.e. particulate material), liquid, or gas. Other embodiments of fertilizer applicators 52 may be utilized for the fertilizer assembly 24, such as a pressurized fertilizer stream that is injected into to soil behind the coulter, without using a knife. Also, if the fertilizer assembly 24 only has a single coulter 24, then the assembly will include a single applicator 52.

The fertilizer assembly 24 is modular for quick and easy mounting and dismounting to docking station 28. The fertilizer assembly frame 30 includes a pair of hooks 60 at the forward end to allow the assembly 24 to be hooked on to a lower, laterally extending cross pin 62 on the docking station 28. A bolt 64 and a nut secure the frame 30 to the docking station 28. Thus, the single bolt 64 and the hooks 60 allow the modular fertilizer assembly 24 to be quickly and easily mounted and dismounted to the planter assembly 10, as needed. As an alternative to the long bolt 64, other fasteners can be used to mount the fertilizer assembly to the docking station. For example, a pair of shortened bolts may be used, one on each side, or other types of quick couplers. Also, the hooks 60 can be modified, to have a different shape than that shown in the figures, without departing from the scope of the invention. As another option, the hooks can be replaced with a different coupler (such as bolts) for mounting to the docking station.

The row cleaner assembly 26 includes a frame 66, with an axle 68 through which a bushing 70 extends. Row cleaner wheels 72 are mounted on opposite ends of the bushing 70. The frame 66 includes hooks 74 for hooking onto an upper cross pin 76 on the docking station 28. A single bolt or pin 78 secures the row cleaner assembly 26 to the docking station 28. The single bolt or pin 78 allows quick and easy mounting and dismounting of the row cleaner assembly 26 to the docking station 28 as a modular assembly.

The axle 68 pivots or reciprocates in the bushings 70. A sleeve 69 is secured to the axle 68 by a pin or bolt 71. A pair of arms 73, or other support structure, are fixed to the sleeve 69 and extends forwardly to support angled plates 75. Each plate 75 includes a series of holes 77 to selectively receive the axle 79 of each wheel 72. The spacing between the wheels 72 and the relative angular orientation therebetween can be changed, depending upon which hole 77 the wheel axles 79 extend through. The wheel axle 79 can take various forms to rotatably support the wheels 72.

The row cleaning wheels 72 float via an actuator 80. In one embodiment, the actuator 80 is a pneumatic cylinder, or alternatively can be a hydraulic cylinder, an electric actuator, a spring force, or electro-magnetic up/down force via a varied electrical current or changing polarity. The upper end of the actuator 80 is fixed to the docking station 28, while the lower end is attached to the plates 75. The actuator 80 allows the wheels 72 to float during use so that the row cleaner 26 follows the soil contour or terrain, and does not plow into or ride over uneven surfaces, as happens with a rigidly mounted row cleaner. The floating functionality of the row cleaner 26 assures that trash is cleared ahead of the row unit 14 as the planter assembly 10 moves through the field.

The docking station 28 includes a bracket 84 mounted to the toolbar 12 with U-bolts or any other convenient fastener. The bracket 84 supports the parallel link arms 17 of the row unit 14. The docking station 28 further includes an upper set of parallel link arms 86 with upper and lower pivot axles 88, 90.

The upper end of the actuator is fixed to the docking station 28, while the lower end is attached to the plates 75. The actuator 80 allows the wheels 72 to float during use so that the row cleaner 26 follows the soil contour or terrain, and does not plow into or ride over uneven surfaces, as happens with a rigidly mounted row cleaner. The floating functionality of the row cleaner 26 assures that trash is cleared ahead of the row unit 14 as the planter assembly 10 moves through the field.

The docking station 28 is similar to the bracket assembly described in Applicant's U.S. Pat. No. 11,185,005 and used to rigidly mount a row cleaner. More particularly, a bracket 84 is mounted to the toolbar 12 with U-bolts (not shown) or any other convenient fastener. The bracket 84 supports the parallel link arms 17 of the row unit 14. The docking station 28 also includes a lower set of parallel link arms 92 having an upper pivot axle 94 and a lower pivot axle 96.

A pair of mounting arms 98 extend downwardly from the pivot axles 90, 96 so as to be operatively connected to the link arms 86, 92. The pins 62, 76 extend through the mounting arms 98 for receipt of the row cleaner frame 66.

Figure 3:
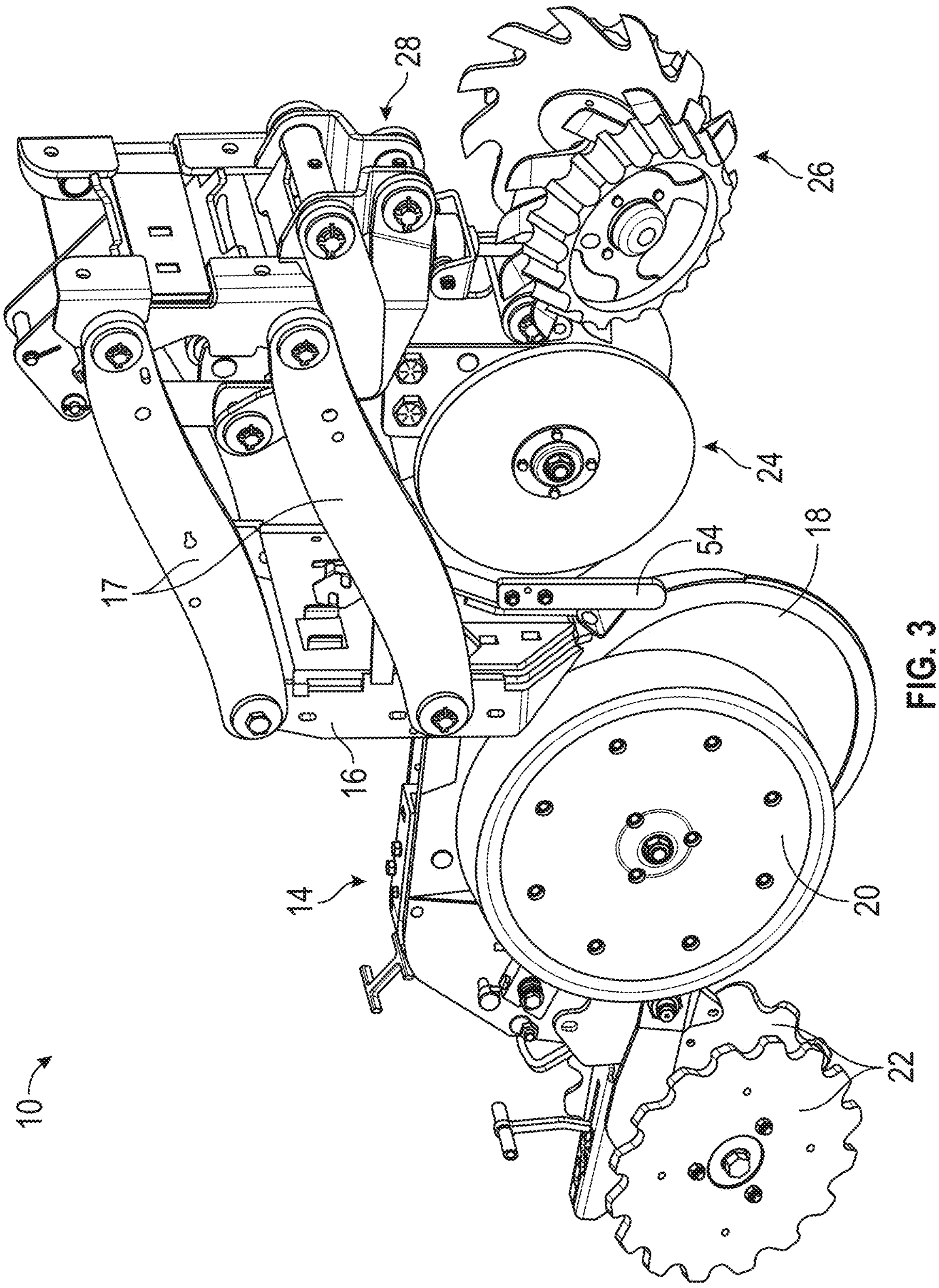
FIG. 3 is a front perspective view of an agricultural row unit having the modular fertilizer assembly and modular row cleaner in a raised position, according to the present invention.
Figure 4:
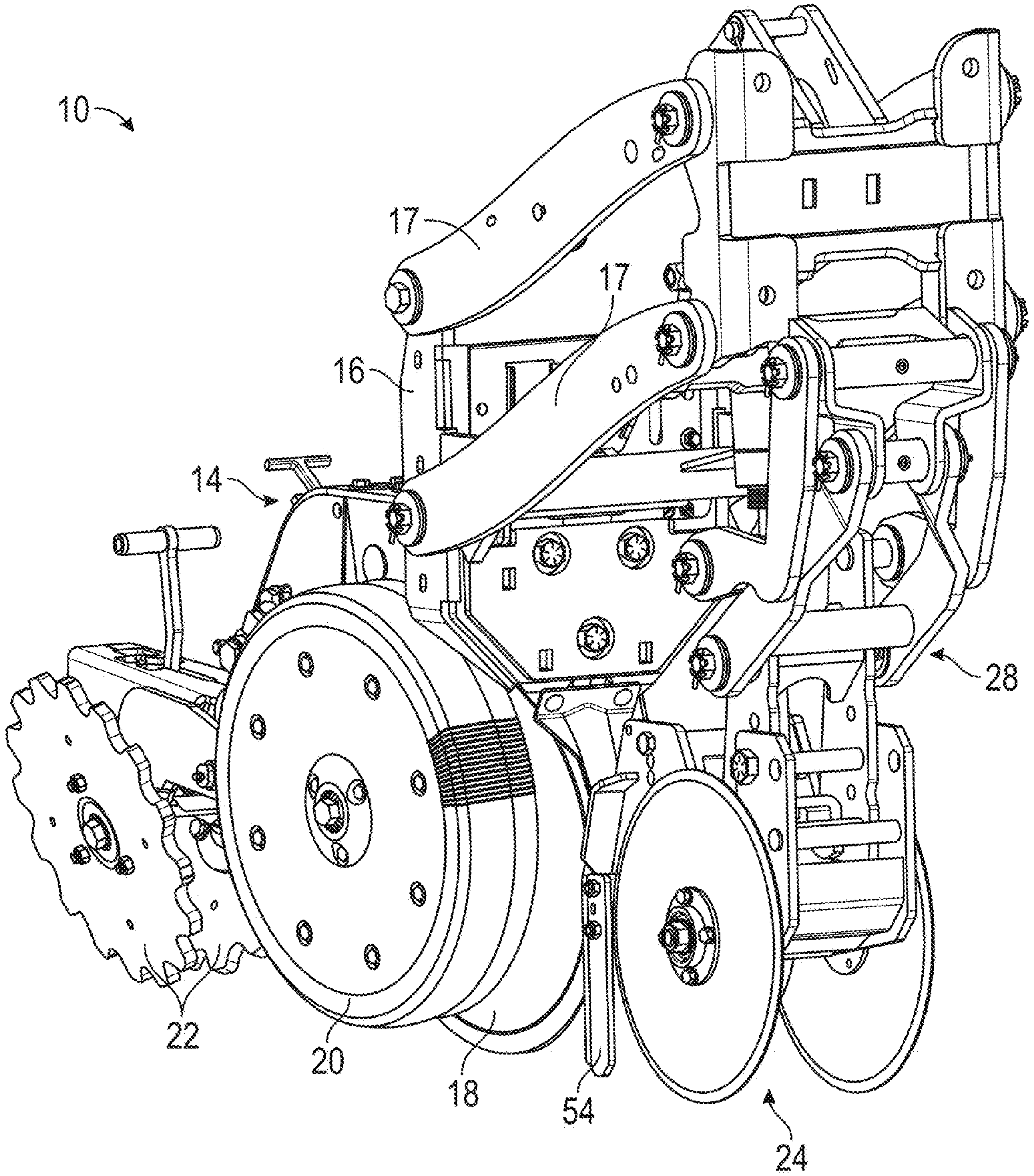
FIG. 4 is a front perspective view showing the fertilizer module, with the row cleaner module removed for clarity.
Figure 5:
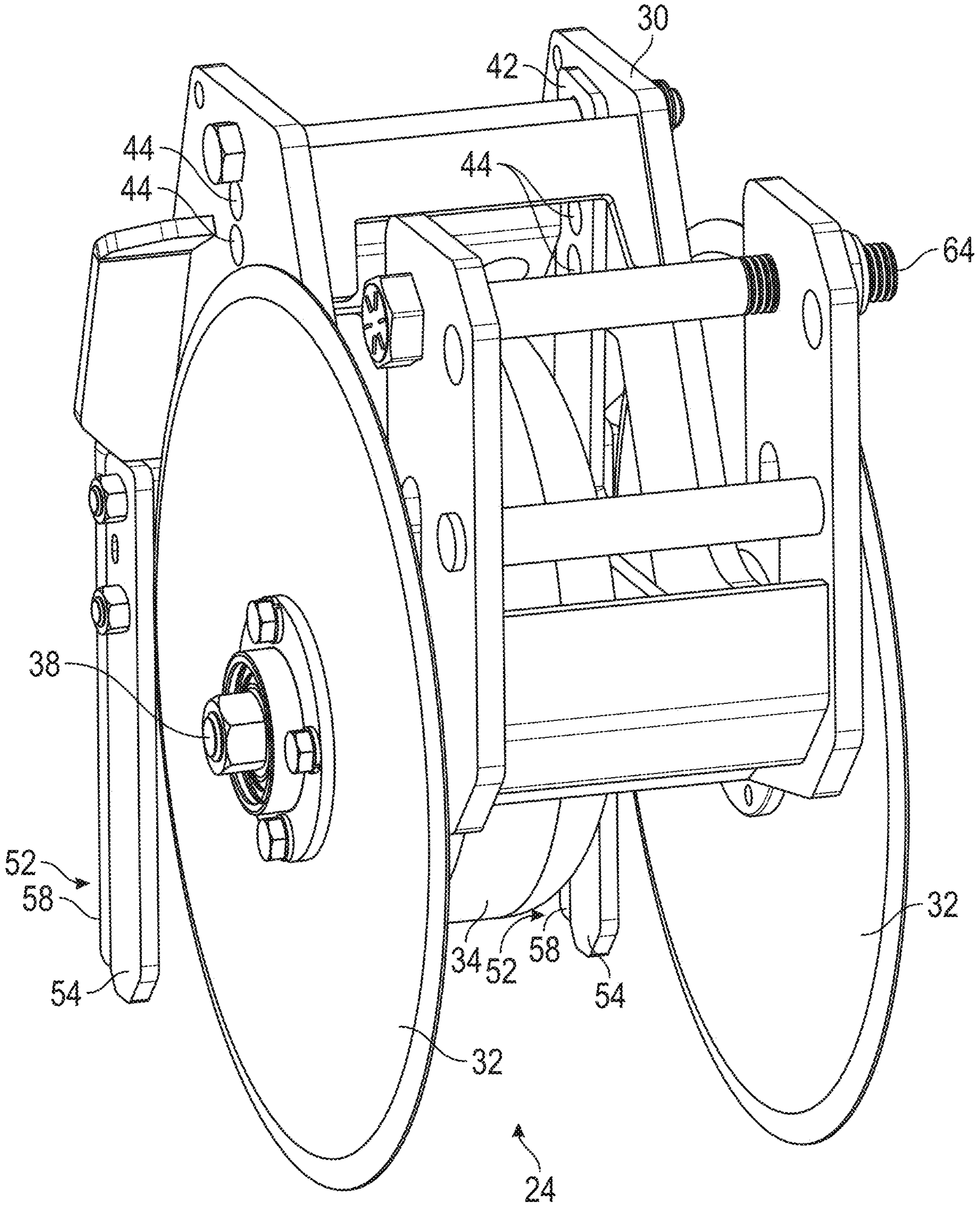
FIG. 5 is a front perspective view of the fertilizer assembly module.
Figure 15:
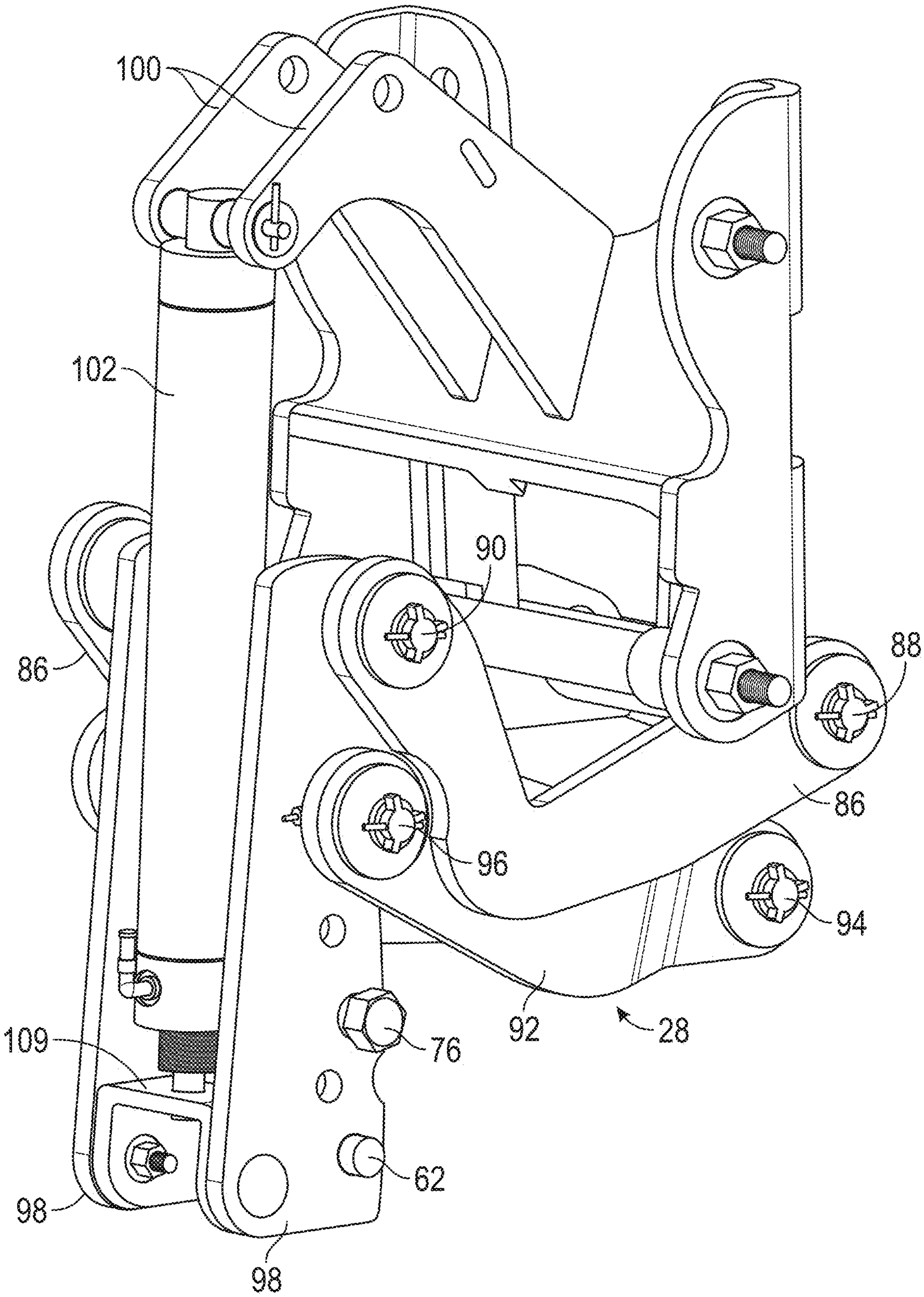
FIG. 15 is a rear perspective view of the docking station in a raised position.
Figure 16:
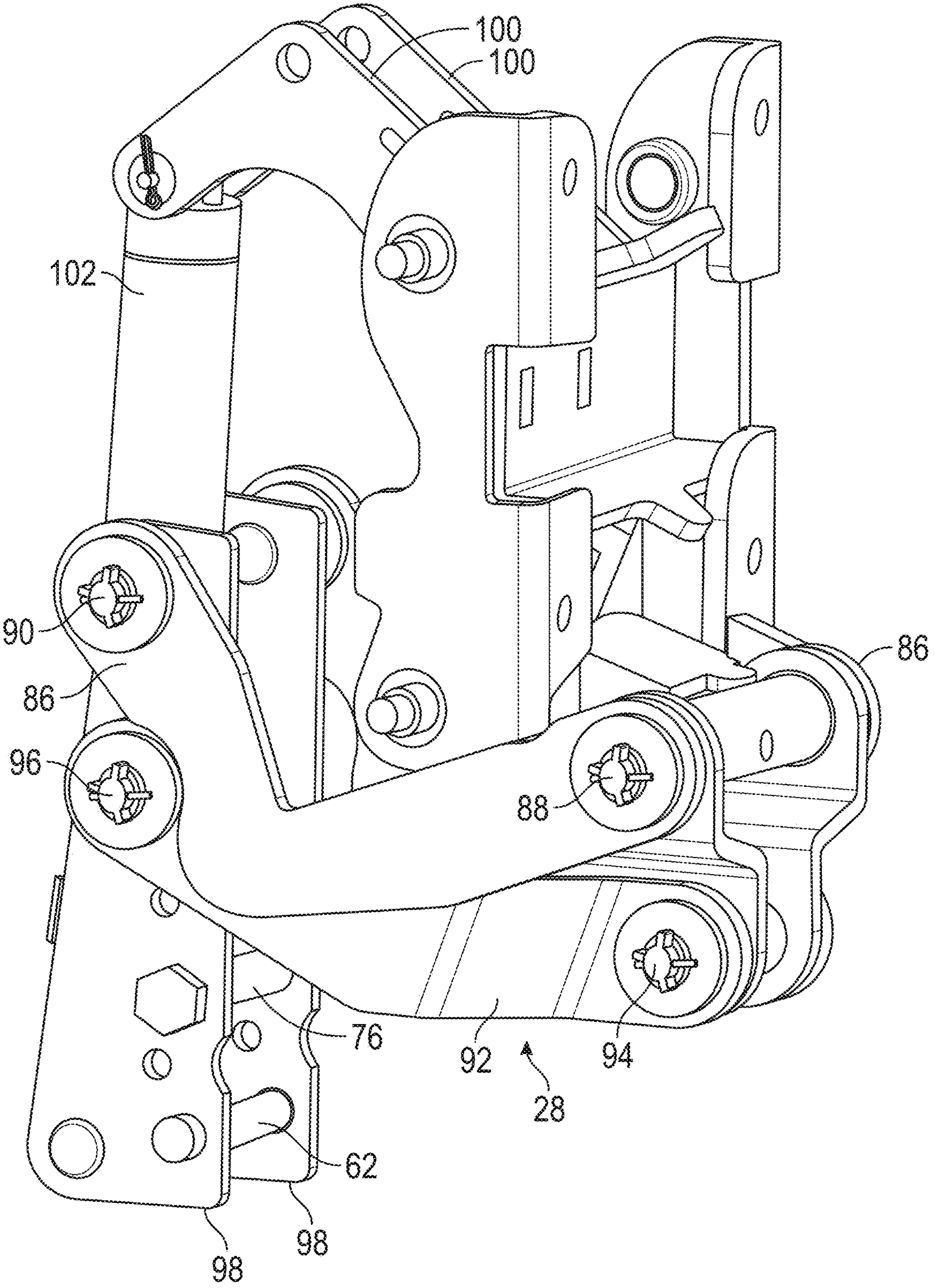
FIG. 16 is a front perspective view of the docking station in a raised position.

The bracket assembly 84 is movable between forward field position (FIGS. 1, 2, 13 and 14) and a raised, transport position (FIGS. 3, 15 and 16).

Figure 13:
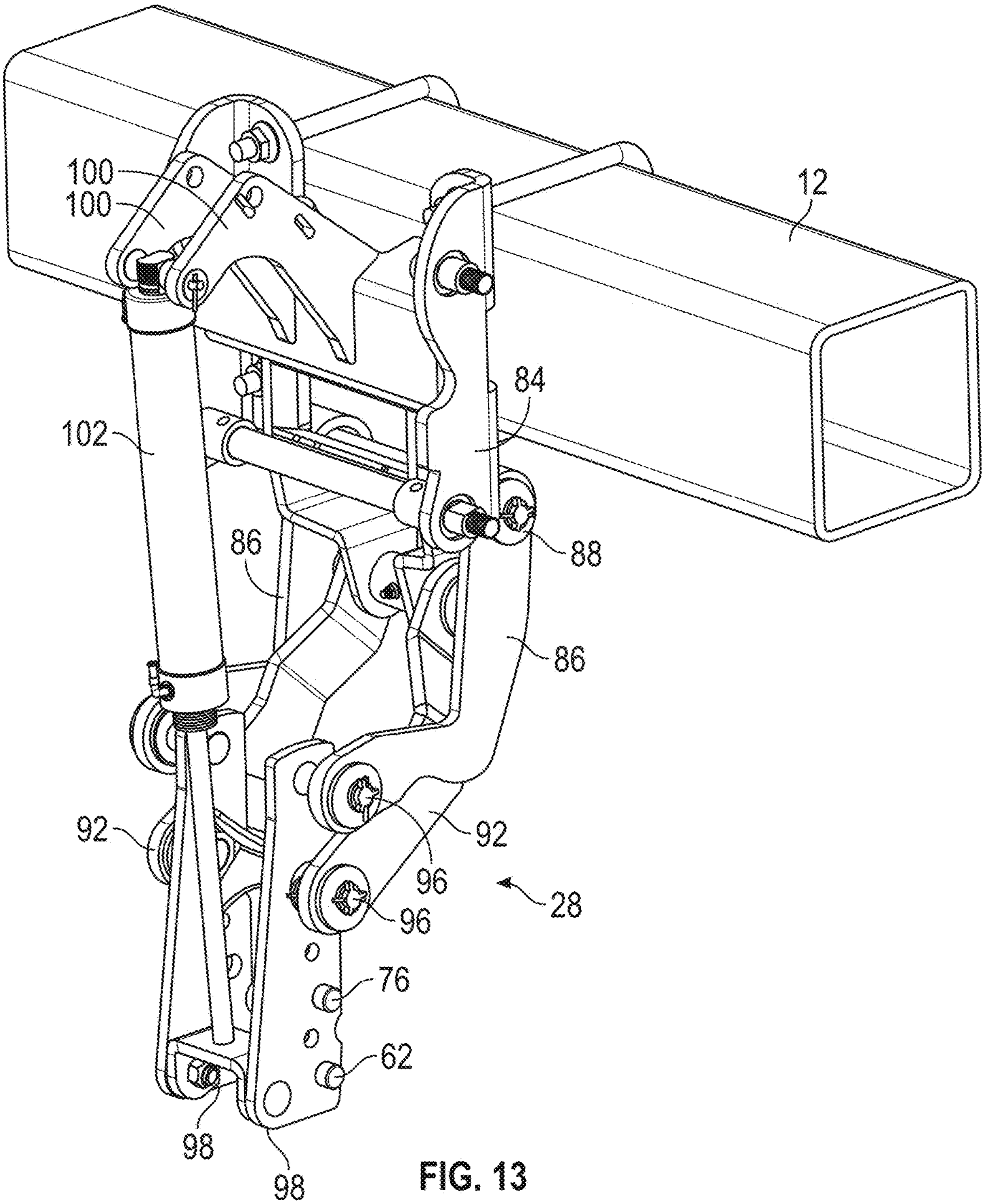
FIG. 13 is a rear perspective view of the docking station for mounting the fertilizer assembly and the row cleaner assembly to the toolbar, in a lowered position.
Figure 14:
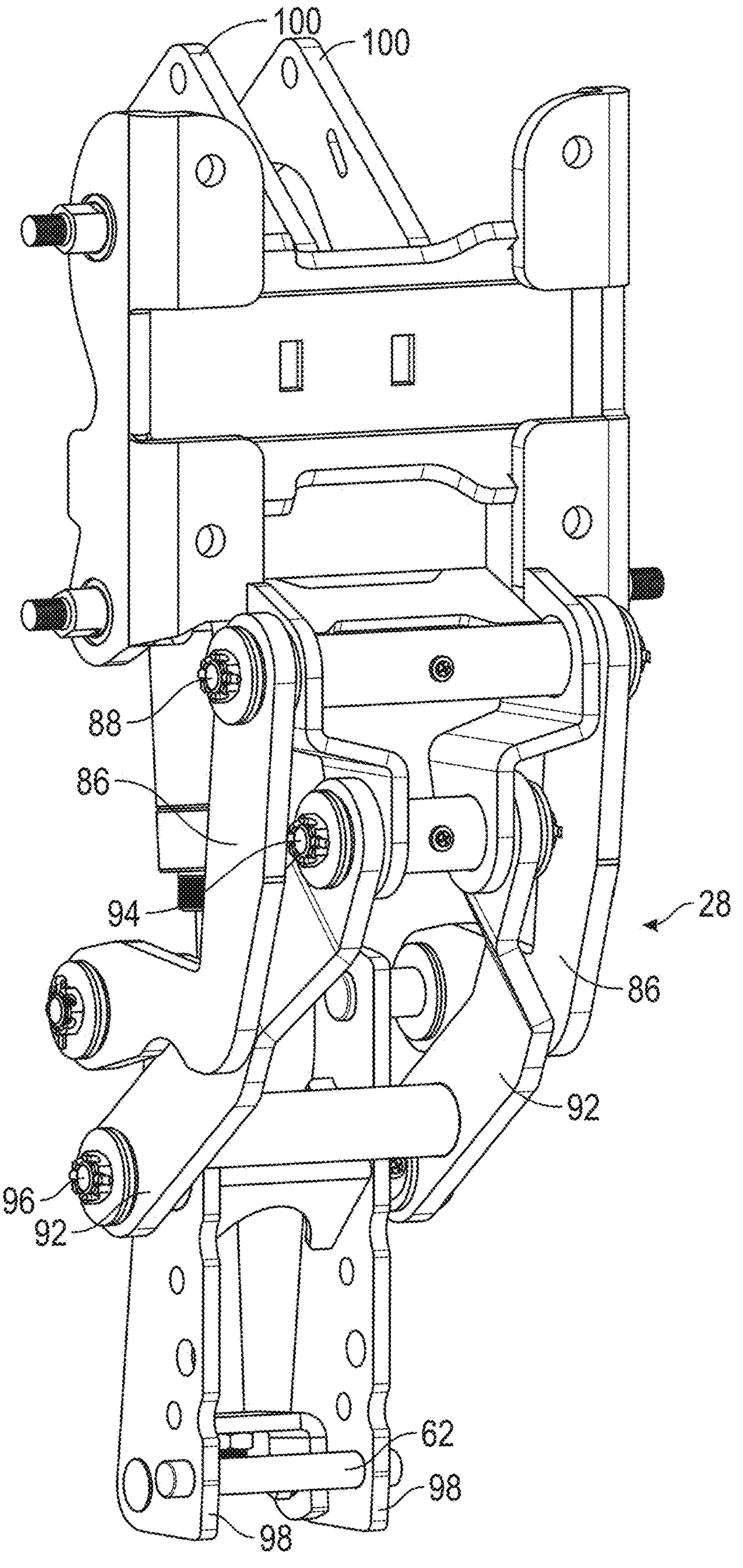
FIG. 14 is a front perspective view of the docking station, in a raised position.

As best seen in FIGS. 13 and 15, a pair of arms 100 extend rearwardly from the bracket 84. An actuator 102 extends between the arms 100 and a lower cross bar or pin 104 at the lower end of the arms 98. The actuator 102 may be any type of linear actuator, such as a hydraulic cylinder, a pneumatic cylinder, and electric motor, or similar devices. The actuator 102 is operatively connected to a control system in the tractor to raise and lower the row cleaner 26 between the field and transport positions.

Thus, the fertilizer assembly 24 and the row cleaner assembly 26 are modular with quick and easy installation and detachment to and from the docking station 28 of the planter assembly 10. The docking station 28 allows the fertilizer assembly 24 and the row cleaner assembly 26 to be raised and lowered independently of the row unit 14 via the actuator 102. The knives 54 and tubes 58 of the fertilizer assembly 24 dispense the fertilizer on either side of the feed slip or channel 106 formed by the furrow opening discs 18 into the slits 108 formed by the knives 54.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved agricultural planter for planting seeds in soil, including a tool bar, a row unit mounted on the tool bar for movement between raised and lowered positions via a first actuator, the improvement comprising:

- a fertilizer assembly and a row cleaner mounted to the tool bar for movement between raised and lowered positions;
- a second actuator for moving the fertilizer assembly and the row cleaner between raised and lowered positions; and
- whereby the movement of the fertilizer assembly and the row cleaner is independent of the movements of the row unit;
- a first mounting bracket on the tool bar for supporting the row unit and a second mounting bracket on the tool bar for supporting the row cleaner and the fertilizer assembly;
- the fertilizer assembly being secured to the second mounting bracket using a single fastener; and
- the fertilizer assembly including hooks for coupling to the second mounting bracket.

2. The improved agricultural planter of claim 1 wherein the fertilizer assembly includes a disc for forming a slot in the soil and a gauge wheel to control depth of the disc.

3. The improved agricultural planter of claim 1 further comprising a third actuator, independent from the second actuator, to allow floating movement of the row cleaner during use, without moving the fertilizer assembly.

4. An agricultural planter having a tool bar with a rear row unit for forming a seed trench in soil and to plant seeds in the trench, the row unit being raised and lowered by a first actuator, the agricultural planter further comprising:

- a docking station extending downwardly from the tool bar;
- a modular row cleaner mounted on the docking station;
- a modular fertilizer assembly mounted on the docking station behind the row cleaner and in front of the row unit;
- a second actuator operatively connected to the docking station to raise and lower the fertilizer assembly and the row cleaner; and
- a third actuator connected to the row cleaner to allow floatation of the row cleaner while in ground engagement.

5. The planter of claim 4 wherein the fertilizer assembly further includes a frame, a coulter disc on the frame to form a slot in the soil, a tube extending downwardly behind the coulter disc to dispense fertilizer into the slot, a gauge wheel adjustably mounted to the frame to control depth on the coulter disc in the soil.

6. The planter of claim 5 wherein the gauge wheel is supported by arms pivotally connected to the frame.

7. The planter of claim 4 wherein the first, second and third actuators operate independently from one another.

8. The planter of claim 4 wherein the row cleaner includes a pivot axis such that the row cleaner floats in use.

9. The planter of claim 4 wherein the fertilizer assembly and the row cleaner each include hooks for mounting to the docking station and a single bolt or pin for securement to the docking station.

10. An improved agricultural planter for planting seeds in soil, including a tool bar, a row unit mounted on the tool bar for movement between raised and lowered positions via a first actuator, the improvement comprising:

- a fertilizer assembly and a row cleaner mounted to the tool bar for movement between raised and lowered positions;
- a second actuator for moving the fertilizer assembly and the row cleaner between raised and lowered positions; and
- whereby the movement of the fertilizer assembly and the row cleaner is independent of the movements of the row unit;
- a first mounting bracket on the tool bar for supporting the row unit and a second mounting bracket on the tool bar for supporting the row cleaner and the fertilizer assembly;
- the fertilizer assembly being hooked to the second mounting bracket; and
- the fertilizer assembly being secured to the second mounting bracket by only one fastener.

11. An improved agricultural planter for planting seeds in soil, including a tool bar, a row unit mounted on the tool bar for movement between raised and lowered positions via a first actuator, the improvement comprising:

- a fertilizer assembly and a row cleaner mounted to the tool bar for movement between raised and lowered positions;
- a second actuator for moving the fertilizer assembly and the row cleaner between raised and lowered positions; and
- whereby the movement of the fertilizer assembly and the row cleaner is independent of the movements of the row unit; and a third actuator, independent from the second actuator, to allow floating movement of the row cleaner during use, without moving the fertilizer assembly.

12. The improved agricultural planter of claim 11 having a first mounting bracket on the tool bar for supporting the row unit and a second mounting bracket on the tool bar for supporting the row cleaner and the fertilizer assembly.

13. The improved agricultural planter of claim 12 wherein the fertilizer assembly is secured to the second mounting bracket using a single fastener.

14. The improved agricultural planter of claim 13 wherein the fertilizer assembly includes hooks for coupling to the second mounting bracket.

15. The improved agricultural planter of claim 11 wherein the fertilizer assembly is hooked to the second mounting bracket.

16. The improved agricultural planter of claim 15 wherein the fertilizer assembly is secured to the second mounting bracket by only one fastener.

17. The improved agricultural planter of claim 11 wherein the fertilizer assembly resides between the row unit and the row cleaner.

18. The improved agricultural planter of claim 11 wherein the fertilizer assembly and the row cleaner are modular so as to be removable from the tool bar separate from the row unit and from one another.

19. The improved agricultural planter of claim 11 wherein the fertilizer assembly includes a coulter blade for cutting a slot in the soil to receive fertilizer.

20. The improved agricultural planter of claim 19 wherein the slot is offset from a seed line of the row unit to apply fertilizer into the slot.

21. The improved agricultural planter of claim 20 wherein the fertilizer assembly includes a fertilizer tube extending into the slot for dispensing fertilizer into the slot.

* * * * *